US012752378B2

(12) United States Patent

Matsuo et al.

(10) Patent No.: US 12,752,378 B2

(45) Date of Patent: Oct. 6, 2026

(54) LASER PROCESSING MACHINE AND METHOD OF CORRECTING SPOT DIAMETER OF LASER PROCESSING MACHINE

(71) Applicant: TOYOTA JIDOSHA KABUSHIKI KAISHA, Toyota (JP)

(72) Inventors: Ryuta Matsuo, Nagakute (JP); Takashi Motoyoshi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 810 days.

(21) Appl. No.: 18/193,817

(22) Filed: Mar. 31, 2023

(65) Prior Publication Data

US 2023/0364718 A1 Nov. 16, 2023

(30) Foreign Application Priority Data

May 12, 2022 (JP) ................................ 2022-078582

(51) Int. Cl.

| | |
|---|---|
| ***B23K 26/70*** | (2014.01) |
| ***B23K 26/046*** | (2014.01) |
| ***B23K 26/064*** | (2014.01) |
| ***B23K 26/082*** | (2014.01) |
| ***B23K 26/21*** | (2014.01) |

(52) U.S. Cl.

CPC .......... *B23K 26/705* (2015.10); *B23K 26/046* (2013.01); *B23K 26/0648* (2013.01); *B23K 26/082* (2015.10); *B23K 26/0643* (2013.01); *B23K 26/21* (2015.10)

(58) Field of Classification Search

CPC .. B23K 26/705; B23K 26/706; B23K 26/707; B23K 26/082; B23K 26/046; B23K 26/064; B23K 26/21; B23K 26/0648; B23K 26/0643

See application file for complete search history.

(56) References Cited

U.S. PATENT DOCUMENTS

| | | | | |
|---|---|---|---|---|
| 2014/0042133 A1* | 2/2014 | Weick | B23K 26/032 | 219/121.81 |
| 2016/0136756 A1 | 5/2016 | Ogura et al. | | |
| 2019/0076959 A1* | 3/2019 | Izumi | B23K 26/082 | |

FOREIGN PATENT DOCUMENTS

| | | | |
|---|---|---|---|
| CN | 105598580 A | 5/2016 | |
| CN | 107138854 A * | 9/2017 | B23K 26/0648 |
| JP | H07-51875 A | 2/1995 | |

(Continued)

*Primary Examiner* — Ryan C Clark

(74) *Attorney, Agent, or Firm* — Sughrue Mion, PLLC

(57) ABSTRACT

A laser processing machine includes a lens for condensing a laser beam, an actuator changing a relative position between the lens and a workpiece to change a focal position of the laser beam, a protective glass disposed between the lens and the workpiece, a detector detecting a focal position of the laser beam, and a controller. The controller obtains a current deviation amount of the focal position from a target position using the detector and obtains relationship data indicating a relationship between the deviation amount and a spot diameter of the laser beam on a surface of the workpiece when contaminant adheres to the protective glass. The controller estimates a current spot diameter using the current deviation amount and the relationship data, and controls the actuator to correct the current spot diameter.

10 Claims, 9 Drawing Sheets

(56) References Cited

FOREIGN PATENT DOCUMENTS

| | | | | | |
|---|---|---|---|---|---|
| JP | 2013528494 | A | * | 7/2013 | ........... B23K 26/073 |
| JP | 2016-2580 | A | | 1/2016 | |
| JP | 2019038000 | A | * | 3/2019 | ............ G01J 1/4257 |
| WO | WO-2022209929 | A1 | * | 10/2022 | ......... B23K 26/0665 |
| WO | WO-2022243569 | A1 | * | 11/2022 | ............. B23K 26/38 |

* cited by examiner

Fig.7

TB

| COMMAND VALUE OF DEFOCUS AMOUNT | INCLINATION OF APPROXIMATE STRAIGHT LINE (SPOT DIAMETER [mm] /FOCUS SHIFT AMOUNT [mm]) |
|---|---|
| −90 | 0.00299 |
| −60 | 0.00320 |
| −30 | 0.00194 |
| 0 | 0.00401 |
| +30 | 0.00221 |
| +60 | 0.00134 |
| +90 | 0.00128 |

LASER PROCESSING MACHINE AND METHOD OF CORRECTING SPOT DIAMETER OF LASER PROCESSING MACHINE

CROSS REFERENCE TO RELATED APPLICATIONS

This application claims priority to Japanese Patent Application No. 2022-078582, filed May 12, 2022, the disclosure of which is incorporated by reference herein in its entirety.

BACKGROUND

Field

The present disclosure relates to a laser processing machine and a method of correcting a spot diameter of a laser processing machine.

Related Art

Patent Document 1 discloses a technique for correcting the deviation of the focal position due to thermal lens effect in the laser processing machine.

Patent Literature 1: JP-07-051875 A

The protective glass provided in the laser head, fumes or spatter-derived dust generated during laser processing may adhere. When the laser head emits a laser beam in a state where dust is attached to the protective glass, the laser beam is scattered by the dust, the converging spot diameter at the processing point is increased, the processing quality is lowered. Therefore, as in the technique described in Patent Document 1, only by correcting the deviation of the focal position due to the thermal lens effect, it is impossible to sufficiently suppress a decrease in processing quality.

SUMMARY

One aspect of the present disclosure provides a laser processing machine. The laser processing machine includes: a lens for condensing a laser beam; an actuator changing a relative position between the lens and a workpiece to change a focal position of the laser beam with respect to the workpiece; a protective glass disposed between the lens and the workpiece; a detector detecting a focal position of the laser beam; and a controller configured to control the actuator, the controller configured to obtain a current deviation amount of the focal position from a target position using the detector, the controller configured to obtain a relationship data, wherein the relationship data indicates relationship between a deviation amount of the focal position from the target position and a spot diameter of the laser beam on a surface of the workpiece when contaminant adheres the protective glass, the controller configured to estimate a current spot diameter of the laser beam on the surface using the current deviation amount and the relationship data, the controller configured to control the actuator to correct the current spot diameter using the current deviation amount and an estimated current spot diameter.

BRIEF DESCRIPTION OF THE DRAWINGS

FIG. 7 is an explanatory view showing contents of a table;

DETAILED DESCRIPTION

A. First Embodiment

Figure 1:
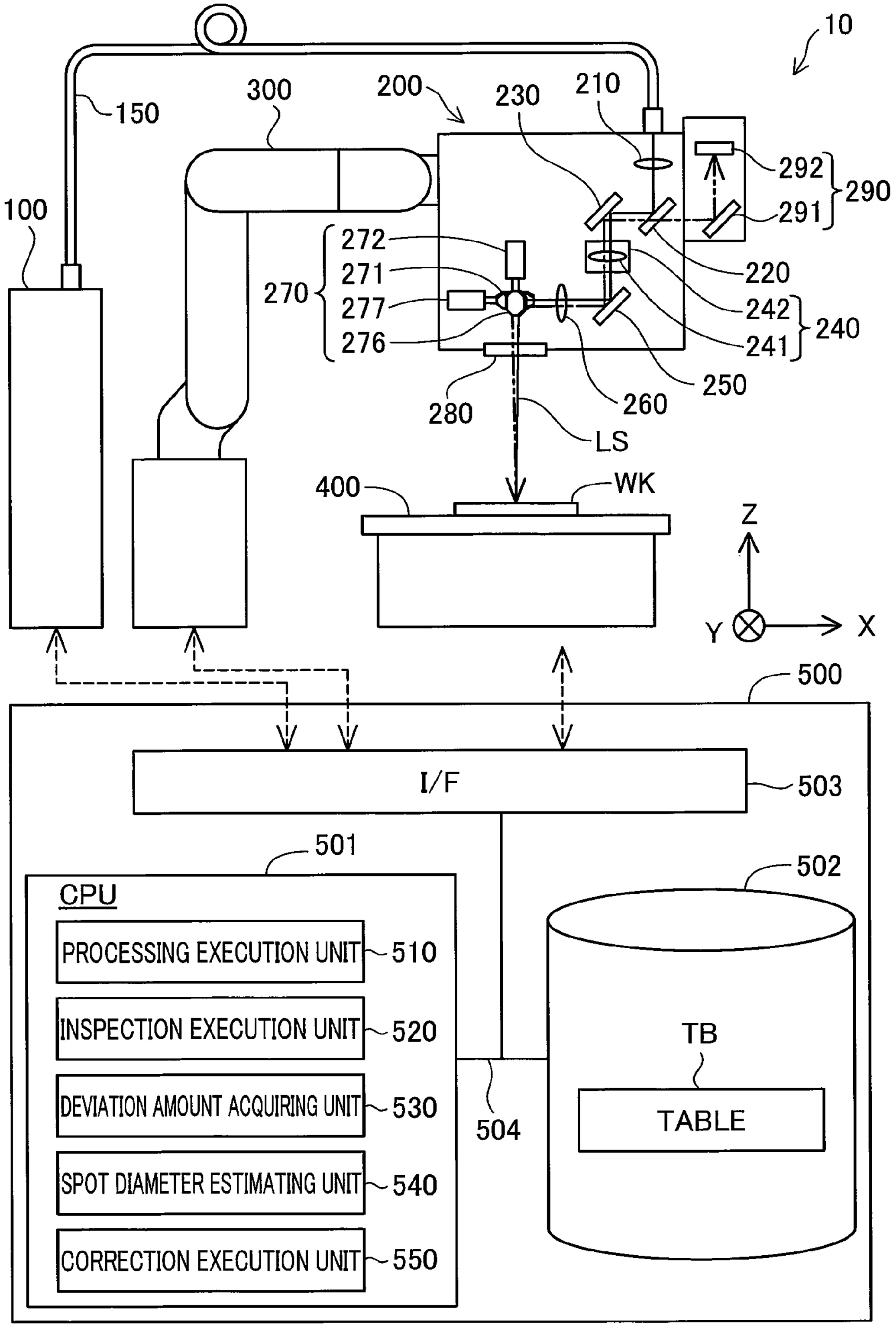
FIG. 1 is an explanatory view showing a schematic configuration of a laser processing machine.

FIG. 1 is an explanatory view showing a schematic configuration of a laser processing machine 10 in the first embodiment. The laser processing machine 10 processes a workpiece WK using a laser beam LS. The processing using the laser beam LS includes, for example, a welding processing, a cutting processing, and a drilling processing. In the present embodiment, the laser processing machine 10 is configured to perform the welding process on the workpiece WK. In other embodiments, the laser processing machine 10 may be configured to perform the cutting processing on the workpiece WK, or may be configured to perform the drilling process on the workpiece WK.

In the present embodiment, the laser processing machine 10 includes a laser oscillator 100, a laser head 200, a head supporting unit 300, a stage 400, and a controller 500. The stage 400, the workpiece WK is fixed.

The laser oscillator 100 generates the laser beam LS. In the present embodiment, the laser beam LS generated by the laser oscillator 100 is a fiber laser. In other embodiments, the laser beam LS generated by the laser oscillator 100 may be, for example, a solid-state laser other than a fiber laser such as a disk laser or a semiconductor laser or a YAG laser. The laser beam LS generated by the laser oscillator 100 is not a solid-state laser, for example, may be a gas laser such as a carbon dioxide laser.

The laser oscillator 100 is connected to the laser head 200 by an optical fiber 150. The laser beam LS generated by the laser oscillator 100 is transmitted from the laser oscillator 100 to the laser head 200 by optical fibers 150. When the laser beam LS to be generated by the laser oscillator 100 is a carbon dioxide laser, rather than the optical fiber 150, it is preferable that the laser beam LS is transmitted from the laser oscillator 100 to the laser head 200 by the bend mirror.

The laser head 200 includes a collimator lens 210, a dichroic mirror 220, a first reflecting mirror 230, a focal position changing unit 240, a second reflecting mirror 250, a condenser lens 260, an irradiation position changing unit 270, and a protective glass 280. The laser beam LS introduced from the optical fiber 150 to the laser head 200 is converted into a collimated light by the collimator lens 210, is reflected toward the first reflecting mirror 230 by the dichroic mirror 220, the focus position changing unit by the first reflecting mirror 230 It is reflected toward the focal position changing unit 240. The laser beam LS passing through the focal position changing unit 240 is reflected toward the condenser lens 260 by the second reflecting mirror 250. The laser beam LS condensed by the condenser lens 260 is guided to the protective glass 280 by the irradiation position changing unit 270, is emitted toward the workpiece WK through the protective glass 280. In FIG. 1, the path of the laser beam LS described above is represented by a solid line.

The focal position changing unit 240 includes a Z lens 241, and a Z lens driving unit 242. Z lens 241 is disposed on the path of the laser beam LS between the first reflecting mirror 230 and the second reflecting mirror 250. In FIG. 1, an arrow representing X,Y,Z axis, which is three coordinate axes perpendicular to each other is shown. X-axis and Y-axis is a coordinate axis parallel to the horizontal plane, Z-axis is a coordinate axis parallel to the vertical direction. Z lens driving unit 242, by changing the position of the Z lens 241 along the path of the laser beam LS, changing the focal position of the laser beam LS in the Z-axis. The Z lens driving unit 242, for example, it is possible to use an electric linear actuator.

The irradiation position changing unit 270 includes an X mirror 271, X mirror driving unit 272, Y mirror 276, and a Y mirror driving unit 277. X mirror 271 and Y mirror 276 is disposed on the path of the laser beam LS between the condenser lens 260 and the protective glass 280. X mirror drive unit 272, by changing the orientation of the X mirror 271 changes the irradiation position of the laser beam LS on the workpiece WK in the X-axis. Y mirror drive unit 277, by changing the orientation of the Y mirror 276 changes the irradiation position of the laser beam LS on the workpiece WK in the Y-axis. The X mirror driving unit 272 and the Y mirror driving unit 277, for example, a motor can be used.

The protective glass 280 is disposed on the path of the laser beam LS between the irradiation position changing unit 270 and the workpiece WK. The protective glass 280 protects various components provided in the laser head 200 from fumes and spatters generated during the welding process. The various components include, for example, condenser lens 260, X mirror 271, and Y mirror 276. In the present embodiment, the protective glass 280 is made of quartz glass on which an antireflection film is formed.

The laser head 200 includes the return light detector 290. The return light detector 290 includes a third reflecting mirror 291, and a photodetector 292. Some of the laser beam LS emitted from the laser head 200 is reflected by the surface of the workpiece WK, it returns to the laser head 200. In the following explanation, the laser beam LS returning to the laser head 200 is referred to as return beam. Return light introduced into the laser head 200 through the protective glass 280 includes an irradiation position changing unit 270, a condenser lens 260, a second reflecting mirror 250, a focal position changing unit 240, a first reflecting mirror 230 in this order through, is guided to the dichroic mirror 220. The return light is transmitted through the dichroic mirror 220 and is introduced into the return light detector 290. The third reflecting mirror 291 reflects toward the photodetector 292 the return light introduced into the return light detector 290. The photodetector 292 receives the return light and outputs an electrical signal representing the intensity of the return light. Electrical signals output from the photodetector 292 is transmitted to the controller 500. In FIG. 1, the path of the return light described above is represented by a two-dot chain line.

The head supporting unit 300 supports the laser head 200. In the present embodiment, the head supporting unit 300 has a function of changing the irradiation position of the laser beam LS on the workpiece WK by changing the position of the laser head 200. In the present embodiment, the head supporting unit 300 is constituted by a robot arm. In other embodiments, the head supporting unit 300 may be constituted by a fixing jig having no function of changing the position of the laser head 200.

The controller 500 comprises a computer comprising a CPU501, a memory 502, an input/output interface 503, and an internal bus 504 interconnecting the two. In the present embodiment, the controller 500 controls the laser oscillator 100, the Z lens driving unit 242 of the focal position changing unit 240, the X mirror driving unit 272 and the Y mirror driving unit 277 of the irradiation position changing unit 270, and the head supporting unit 300. Incidentally, the memory 502 is sometimes referred to as a storage unit.

In this embodiment, the controller 500 includes a processing execution unit 510, an inspection execution unit 520, a deviation amount acquiring unit 530, a spot diameter estimating unit 540, and a correction execution unit 550. The processing execution unit 510, the inspection execution unit 520, the deviation amount acquiring unit 530, the spot diameter estimating unit 540, and the correction execution unit 550 are implemented in software by CPU501 executing a computer program stored in the memory 502. The controller 500 may be configured by a combination of a plurality of circuits, rather than a computer.

The processing execution unit 510, by irradiating a laser beam LS on the workpiece WK from the laser head 200, executes the welding of the workpiece WK. The processing execution unit 510, by controlling the focal position changing unit 240, the focal position of the laser beam LS becomes a target position determined in advance, and the spot diameter of the laser beam LS at the surface of the workpiece WK is adjusted to be a target diameter determined in advance. The processing execution unit 510, by controlling the irradiation position changing unit 270, while moving the irradiation position of the laser beam LS on the workpiece WK, subjected to weld machining on the workpiece WK. The processing execution unit 510, as the focal position of the laser beam LS is positioned on the laser head 200 side with respect to the surface of the workpiece WK, and controls the focal position changing unit 240. The processing execution unit 510, the temperature of the optical element such as a condenser lens 260 provided in the laser head 200 starts the welding process after stable.

The inspection execution unit 520, the laser beam LS of low power as compared with the time of processing is irradiated to the workpiece WK from the laser head 200, the strength of the return light measured by the photodetector 292 of the return light detector 290 to inspect the weld quality of the workpiece WK.

Specifically, the inspection execution unit 520, the waveform of the intensity of the return light measured by the photodetector 292, compared with the reference waveform previously stored in the memory 502, to determine the quality of the weld quality of the workpiece WK. The reference waveform, it is possible to use a waveform of the intensity of the return light obtained by irradiating a laser beam LS of low power to good from the laser head 200.

The deviation amount acquiring unit 530, using the return light detector 290, acquires the deviation amount from the target position of the focal position of the laser beam LS. In the following description, the deviation amount from the target position of the focal position is referred to as a focus shift amount. The focus shift amount is a positive value when the focal position is shifted in a direction from the workpiece WK to the laser head 200, a negative value when the focal position is shifted in a direction from the workpiece WK to the laser head 200. The method of obtaining the focus shift amount will be described later. The spot diameter estimating unit 540 estimates the current spot diameter using the current focus shift amount acquired by the deviation amount acquiring unit 530 and a table TB representing the relation between the focus shift amount and the spot diameter of the laser beam LS previously stored in the memory 502. The correction execution unit 550, in the spot diameter correction process, executes a correction of the current spot diameter of the laser beam LS.

Figure 2:
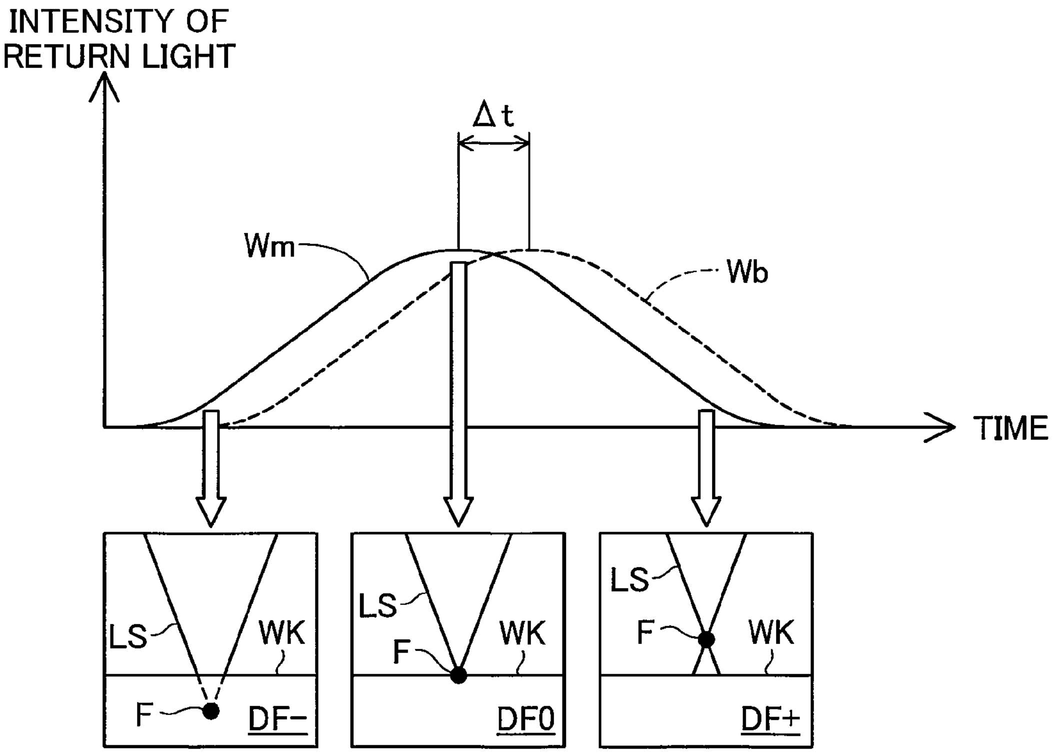
FIG. 2 is an explanatory view showing a relationship between time and an intensity of a return light when a focal position is moved.

FIG. 2 is an explanatory diagram showing the relationship between the intensity of the time and the return light when moving the focal position F at a constant speed. In FIG. 2, the horizontal axis represents the time, the vertical axis represents the intensity of the return light. A method of acquiring the focus shift amount in the present embodiment will be described with reference to FIG. 2. First, the deviation amount acquiring unit 530 is irradiated with a laser beam LS of low power toward the workpiece WK from the laser head 200, while changing the distance between the focal position F and the workpiece WK of the laser beam LS by the focal position changing unit 240 at a constant speed, the light receiving element of the return light detector 290 It measures the strength of the return light by 292. In the following explanation, the distance between the focal position F of the laser beam LS and the surface of the workpiece WK is referred to as a defocus quantity. When the defocus amount is negative, the focal position F is located on the stage 400 side with respect to the surface of the workpiece WK, when the defocus amount is positive, the focal position F is located on the laser head 200 side with respect to the surface of the workpiece WK. The smaller the absolute value of the defocus amount increases the intensity of the return light, the intensity of the return light becomes maximum when the defocus amount is zero. Next, the deviation amount acquiring unit 530, the time until the peak of the intensity of the return light in the waveform Wm of the intensity of the return light to be measured when the focal position F is moved at a constant speed so that the defocus amount is from minus to plus, and the reference waveform Wb of the intensity of the return light stored in advance in the memory 502 of the controller 500 calculates a difference Δt between the time until the peak of the intensity of the return light appears. The deviation amount acquiring unit 530 acquires the focus shift amount by multiplying the difference Δt by the moving speed of the focal position F.

Figure 3:
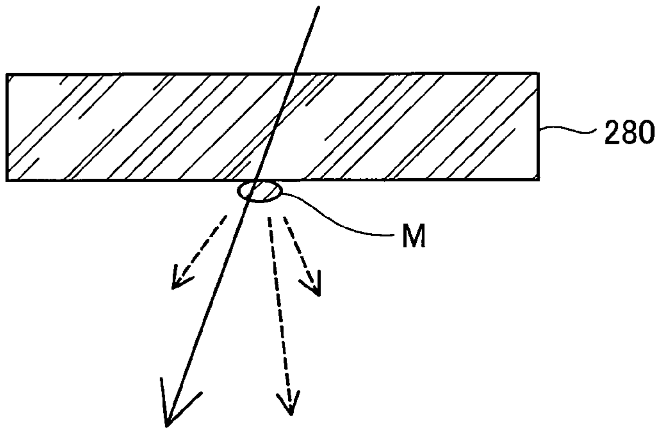
FIG. 3 is an explanatory view showing a state of scattering of laser light by contaminants adhering to a protective glass.

FIG. 3 is an explanatory view showing a state of scattering of laser light by contaminants adhering to a protective glass. Contaminants M may adhere to the surface of the protective glass 280. Contaminant M is, for example, fumes or spatter-derived dust generated during processing. When the contaminant M on the surface of the protective glass 280 is adhered, the laser beam LS is scattered by the contaminant M, the spot diameter of the laser beam LS at the processing point of the surface of the workpiece WK is increased. Furthermore, the temperature of the protective glass 280 is increased by the contaminant M is heated by the laser beam LS, the focal position F of the laser beam LS is shifted to the laser head 200 by the thermal lens effect of the protective glass 280. Therefore, when the contaminant M on the surface of the protective glass 280 is adhered, not only scattered laser beam LS, the spot diameter of the laser beam LS at the processing point also by thermal lens-effect is changed. When the spot diameter of the laser beam LS at the processing point is changed, since the energy density of the laser beam LS at the processing point is changed, there is a possibility that processing quality and inspection accuracy is lowered. Therefore, in the present embodiment, the controller 500, prior to the execution of the processing and inspection of the workpiece WK, to correct the focal diameter at the processing point by the spot diameter correction process to be described later.

Figure 4:
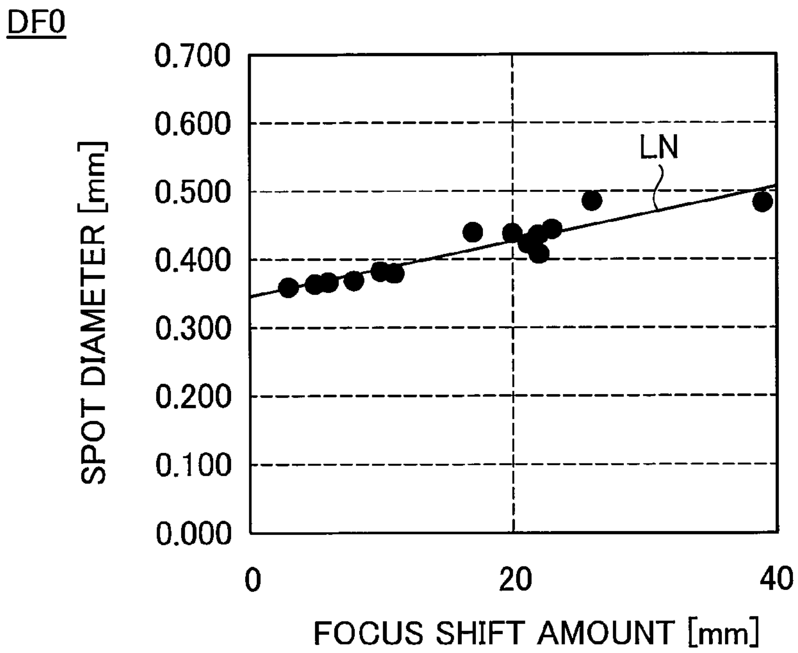
FIG. 4 is a first graph showing a relationship between a focus shift amount and a spot diameter.
Figure 5:
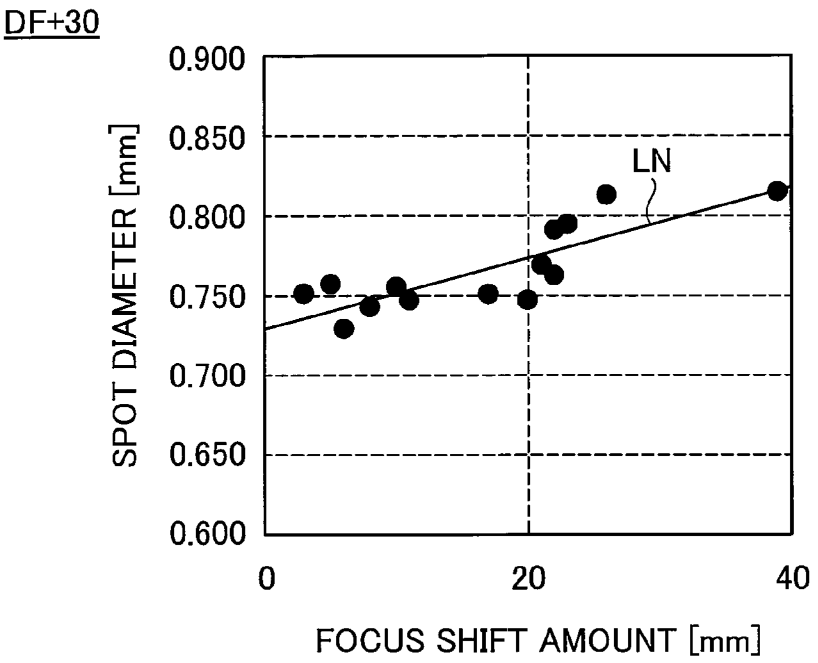
FIG. 5 is a second graph showing the relationship between the focus shift amount and the spot diameter.
Figure 6:
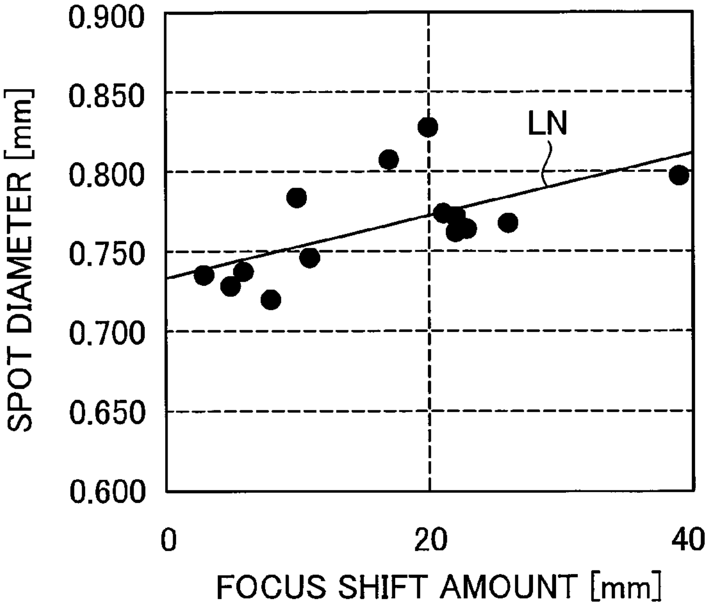
FIG. 6 is a third graph showing the relationship between the focus shift amount and the spot diameter.

FIG. 4 is a first graph showing the relationship between the focus shift amount and the spot diameter. FIG. 5 is a second graph showing the relationship between the focus shift amount and the spot diameter. FIG. 6 is a third graph showing the relationship between the focus shift amount and the spot diameter. In FIG. 4 to FIG. 6, the horizontal axis represents the focus shift amount, the vertical axis represents the spot diameter. In FIG. 4 to FIG. 6, the laser beam LS is irradiated from the laser head 200 with different contamination degree of the protective glass 280, a plurality of measurement data obtained by measuring the focus diameter on the surface of the focus shift amount and the workpiece WK is represented by a circle.

In FIG. 4, the measurement data when the command is given to the focal position changing unit 240 so that the defocus amount is 0 mm is represented. In FIG. 5, the measurement data when the command is given to the focal position changing unit 240 so that the defocus amount is in the +30 mm is represented. In FIG. 6, measurement data when the command is given to the focal position changing unit 240 so that the defocus amount is-30 mm is represented. Focus shift amount was measured by the method described with reference to FIG. 2. Focus shift amount, after the beginning of the illumination of the laser beam LS, converges to a constant value increases with the elapse of time. Therefore, after a predetermined time has elapsed from the beginning of the irradiation of the laser beam LS, it is preferable that the focus shift quantity is measured. The focal diameter was measured using a focused spot analyzer.

In FIG. 4 to FIG. 6 show the approximate linear LN of the measurement. The approximate line can be calculated, for example, by the least square method. When the defocus command differs, the slope of the approximate linear LN differs. Even the command value of the defocus amount is any value, the larger the degree of contamination of the protective glass 280 increases the focus shift amount, the larger the focus shift amount increases the spot diameter. When the command value of the defocus amount is positive, the larger the command value of the defocus amount, the smaller the inclination of the approximate straight line.

FIG. 7 is an explanatory diagram illustrating a table TB representing the inclination of an approximate linear LN for each command value of the defocus quantity. In the present embodiment, the memory 502 of the controller 500 stores a table TB representing the relation between the command value of the defocus amount and the slope of the approximate linear LN, which is obtained by the methods described with reference to FIG. 4 to FIG. 6.

Figure 8:
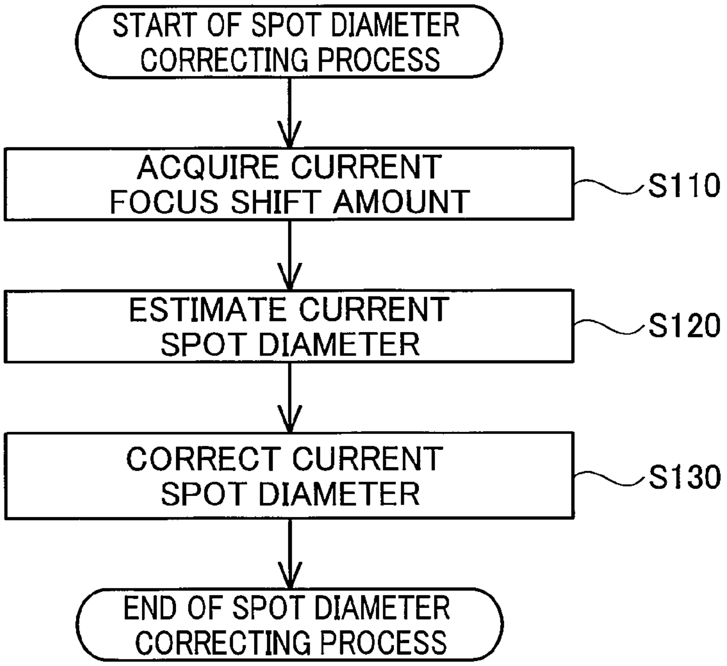
FIG. 8 is a flowchart showing contents of a spot diameter correction process.

FIG. 8 is a flowchart showing the contents of the spot diameter correcting process in the present embodiment. The spot diameter correcting process, prior to processing and inspecting the workpiece WK by the laser processing machine 10, is executed by the controller 500. First, in a step S110, the deviation amount acquiring unit 530 of the controller 500 acquires the current focus shift amount of the laser beam LS. In the present exemplary embodiment, the deviation amount acquiring unit 530 acquires the focus shift amount by the method described with reference to FIG. 2.

Next, in a step S120, the spot diameter estimating unit 540 estimates the current spot diameter of the laser beam LS at the processing point using the focus shift amount obtained by the deviation amount acquiring unit 530 and the relational data. The relationship data is a data representing the relationship between the focus shift amount and the spot diameter when the contaminant M is attached to the protective glass 280. The relationship data is previously stored in the memory 502. In the present embodiment, the table TB shown in FIG. 7 is previously stored in the memory 502 as relationship data. The spot diameter estimating unit 540 reads the slope of the approximate linear LN corresponding to the command value of the current defocus amount from the table TB. The spot diameter estimating unit 540, by multiplying the inclination of the approximate linear LN to the focus shift amount obtained by the deviation amount acquiring unit 530, to obtain an increased amount of the spot diameter from the target diameter. The spot diameter estimating unit 540, using the increase amount of the spot diameter from the target diameter, estimates the current spot diameter.

In a step S130, the correction execution unit 550, as the current spot diameter of the laser beam LS at the processing point is the same as the target diameter, and corrects the current spot diameter. In the present embodiment, the correction execution unit 550, by moving the focal position F of the laser beam LS using the focal position changing unit 240, corrects the current spot diameter of the laser beam LS at the processing point. Correction execution unit 550, a first movement amount L1 for moving the focal position F so that the focus shift amount becomes zero, the focal position F further so that the focal position F as the focal diameter at the processing point from the position where the focus shift amount becomes zero in the sum amount of the second movement amount L2 for moving, to move the focal position F. Thereafter, the correction execution unit 550 ends the spot diameter correction process. Incidentally, the method performed by the spot diameter correction process is sometimes referred to as a spot diameter correction method of the laser processing machine 10. The step S110 of the spot diameter correction process is referred to as a deviation acquiring process, the step S120 is referred to as a spot diameter estimation process, the step S130 is sometimes referred to as a correction executing process.

Figure 9:
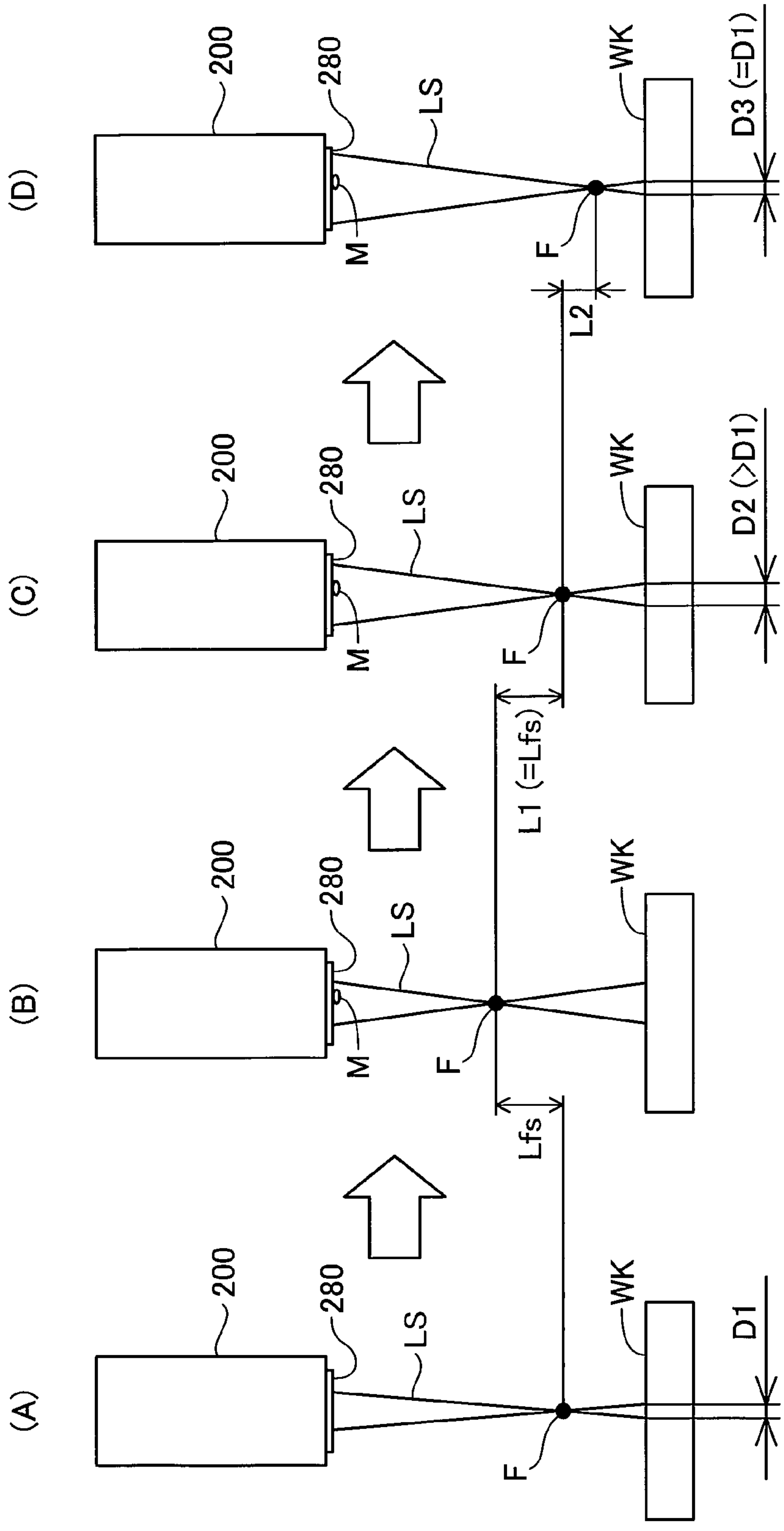
FIG. 9 is an explanatory view showing a state in which the spot diameter is corrected by the spot diameter correction process.

FIG. 9 is an explanatory view schematically showing a state in which the spot diameter of the laser beam LS is corrected by the spot diameter correcting process. At the time point (A) in FIG. 9, no contaminant M adheres to the protective glass 280 of the laser head 200. At the time of (A), the focal position F of the laser beam LS is disposed at the target position, the spot diameter D1 of the laser beam LS at the processing point is the same size as the target diameter.

As shown in (B) in FIG. 9, when the contaminant M is attached to the protective glass 280, by the focal position F of the laser beam LS by the thermal lens effect of the protective glass 280 is moved from the target position to the laser head 200 side, and, by scattering of the laser beam LS by the contaminant M, the spot diameter at the processing point is larger than the target diameter.

As shown in (C) in FIG. 9, as the focal position F returns to the position at the time of (A), the focal position F in the same first movement amount L1 as the focus shift amount Lfs even if moved to the workpiece WK, the spot diameter D2 at the processing point is greater than the spot diameter D1 at the processing point at the time of (A). That is, in the state of (C), although the deviation of the focal position F from the target position due to the thermal lens-effect has been eliminated, deviation of the focal diameter from the target diameter due to scattered laser beam LS has not been eliminated.

As shown in (D) in FIG. 9, when moving the focal position F further to the workpiece WK in the second movement amount L2 from the position in the state of (C), the spot diameter D3 at the processing point is the same size as the spot diameter D1 at the processing point at the time of (A). That is, the deviation of the spot diameter from the target diameter by scattering of the laser beam LS is eliminated. In the present embodiment, by the spot diameter correcting process is executed, the focal position F of the laser beam LS and the focal diameter at the processing point is changed from the state of (B) to the state of (D).

According to the laser processing machine 10 in the present embodiment described above, the controller 500, by executing the spot diameter correction process, it is possible to correct the deviation of the spot diameter due to the contaminant M is attached to the protective glass 280. Therefore, by spot diameter at the processing point deviates from the target diameter, and the quality of processing using the laser beam LS, it is possible to suppress the accuracy of the inspection using the return light is lowered.

Further, in the present embodiment, the table TB stored in the memory 502, as the focus shift amount in the direction from the workpiece WK toward the laser head 200 is increased, it is represented that the spot diameter at the processing point increases. Therefore, as the degree of contamination of the protective glass 280 is large, with the focus shift amount in the direction from the workpiece WK toward the laser head 200 is increased by the thermal lens effect, the spot diameter at the processing point by the scattering phenomenon of the laser beam LS by utilizing the phenomenon that increases, it is possible to appropriately correct the spot diameter at the processing point.

In the present embodiment, the correction execution unit 550, a first movement amount L1 for moving the focal position F so that the focus shift amount becomes zero, the focal position F so that the spot diameter at the processing point from the position where the focus shift amount becomes zero is the target diameter in the total amount of the second movement amount L2 for further moving, to move the focal position F. Therefore, even without moving the focal position F by dividing twice, it is possible to correct the spot diameter in the movement of one focal position F. Therefore, it is possible to shorten the correction of the spot diameter.

Further, in the present embodiment, the deviation amount acquiring unit 530 acquires the focus shift amount using the return light detector 290. Therefore, the acquisition of the focus shift amount can be automated.

B. Other Embodiments (B1) In the first embodiment described above, the correction execution unit 550, in the spot diameter correction process, by changing the position of the Z lens 241 by the Z lens driving unit 242 of the laser head 200, the focal position F of the laser beam LS by changing the distance between the workpiece WK, to correct the spot diameter of the laser beam LS at the processing point. In contrast, the correction execution unit 550, the spot diameter correction process, by changing the position of the laser head 200 by the head supporting unit 300, by changing the distance between the focal position F and the workpiece WK of the laser beam LS, the laser beam at the processing point it may be corrected spot diameter of LS. In this case, the head supporting unit 300 is referred to as a focal position changing unit. Alternatively, lifting device driven under the control of the controller 500 is provided on the stage 400, by changing the distance between the focal position F and the workpiece WK by the lifting device, the laser beam LS in the processing point it may be corrected spot diameter. In this case, the lifting device provided in the stage 400 is referred to as a focus position changing unit.

(B2) In the first embodiment described above, the laser processing machine 10, the return light detector 290 is provided with a photodetector 292. In contrast, it may not be returned to the laser processing machine 10 photodetector 290 is provided. In this case, the deviation amount acquiring unit 530, for example, may acquire the focus shift amount input by the user.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) In one aspect of the present disclosure, a laser processing machine is provided. The laser processing machine includes: a lens for condensing a laser beam; an actuator changing a relative position between the lens and a workpiece to change a focal position of the laser beam with respect to the workpiece; a protective glass disposed between the lens and the workpiece; a detector detecting a focal position of the laser beam; and a controller configured to control the actuator, the controller configured to obtain a current deviation amount of the focal position from a target position using the detector, the controller configured to obtain a relationship data, wherein the relationship data indicates relationship between a deviation amount of the focal position from the target position and a spot diameter of the laser beam on a surface of the workpiece when contaminant adheres the protective glass, the controller configured to estimate a current spot diameter of the laser beam on the surface using the current deviation amount and the relationship data, the controller configured to control the actuator to correct the current spot diameter using the current deviation amount and an estimated current spot diameter.

According to the laser processing machine of this form, it is possible to correct the change in spot diameter at the processing point caused by contaminants adhere to the protective lens. Therefore, it is possible to suppress a decrease in processing quality of the laser processing by the laser processing machine.

(2) According to the laser processing machine of the above aspect, the relationship data may represent that the spot diameter increases as the deviation amount increases from the workpiece toward the lens.

According to the laser processing machine of this form, the greater the degree of contamination of the protective glass is focal position in a direction away from the workpiece by the thermal lens effect is increased, the greater the degree of contamination of the protective glass is the laser beam scattering phenomenon spot diameter is increased, utilizing the phenomenon that can appropriately correct the spot diameter.

(3) According to the laser processing machine of the above aspect, the controller may be configured to control the actuator so that the focal position moves a total distance of a first distance and a second distance to correct the current spot diameter, wherein the first distance may be a distance for moving the focal position so that the current deviation amount to be zero, wherein the second distance may be a distance for moving the focal position from the position where the current deviation amount is zero so that the spot diameter on the surface to be a target diameter.

According to the laser processing machine of this form, even without moving the focal position of the laser beam divided into two, it is possible to correct the focal diameter of the laser beam in the movement of one focal position. Therefore, it is possible to shorten the correction of the focal diameter of the laser beam.

(4) According to the laser processing machine of the above aspect, the detector may include a photodetector for receiving the laser beam reflected from the workpiece, the controller may be configured to obtain the current deviation amount using intensity of the laser beam measured by the photodetector.

According to the laser processing machine of this form, it can automate the acquisition of the current deviation amount of the focal position of the laser beam.

(5) In one aspect of the present disclosure, a method of correcting a spot diameter of a laser processing machine is provided. The laser processing machine including a protective glass for protecting a lens. The method includes: obtaining a current deviation amount of a focal position of the laser beam from a target position, wherein the laser beam is irradiated on a surface of a workpiece through the lens and the protective glass; estimating a current spot diameter of the laser beam on the surface using the current deviation amount and a relationship data, wherein the relationship data indicates the relationship between the deviation amount and the spot diameter when contaminant adheres the protective glass; and changing a relative position between the lens and the workpiece using the current deviation amount and the estimated current spot diameter to correct the current spot diameter.

According to the spot diameter correction method of this form, it is possible to correct the change in the focal diameter at the processing point caused by contaminants adhere to the protective lens. Therefore, it is possible to suppress a decrease in processing quality of the laser processing by the laser processing machine.

The present disclosure, a laser machine, it is also possible to realize in various forms other than the method of correcting a spot diameter of a laser processing machine. For example, it can be realized in the form of a laser processing method.

What is claimed is:

1. A laser processing machine comprising:

a lens for condensing a laser beam;

an actuator changing a relative position between the lens and a workpiece to change a focal position of the laser beam with respect to the workpiece;

a protective glass disposed between the lens and the workpiece;

a detector detecting the focal position of the laser beam; and a controller comprising a processor and a memory, wherein the memory stores a relationship data, wherein the relationship data indicates a relationship between a deviation amount of the focal position from a target position and a spot diameter of the laser beam on a surface of the workpiece when contaminant adheres to the protective glass, wherein the processor is configured to:

obtain a current deviation amount of the focal position from the target position using the detector, obtain the relationship data stored in the memory, estimate a current spot diameter of the laser beam on the surface of the workpiece based on the current deviation amount and the relationship data, correct the current spot diameter by controlling the actuator so that the focal position moves a total distance of a first distance and a second distance, wherein the first distance is a distance for moving the focal position so that the current deviation amount becomes zero, and wherein the second distance is a distance for moving the focal position from a position in which the current deviation amount is zero to a position in which the spot diameter on the surface becomes a target diameter.

2. The laser processing machine according to claim 1, wherein the relationship data represents that the spot diameter increases as the deviation amount increases from the workpiece toward the lens.

3. The laser processing machine according to claim 1, wherein the detector includes a photodetector for receiving the laser beam reflected from the workpiece, the processor is configured to obtain the current deviation amount using intensity of the laser beam measured by the photodetector.

4. The laser processing machine according to claim 1, wherein the relationship data is stored in the memory as a table representing a slope of an approximate line indicating a relationship between the deviation amount and the spot diameter for each command value of a defocus amount.

5. The laser processing machine according to claim 1, wherein the processor is configured to estimate the current spot diameter by multiplying the current deviation amount by a slope of an approximate line read from the relationship data to obtain an increase amount of the spot diameter from the target diameter.

6. The laser processing machine according to claim 1, wherein the correcting the spot diameter includes moving the focal position by the total distance of the first distance and the second distance in a single movement.

7. A method of correcting a spot diameter of a laser processing machine, the laser processing machine including a protective glass for protecting a lens, and a detector detecting a focal position of a laser beam, the method comprising:

storing a relationship data in a memory, wherein the relationship data indicates a relationship between a deviation amount of the focal position from a target position and a spot diameter of the laser beam on a surface of a workpiece when contaminant adheres to the protective glass;

obtaining a current deviation amount of the focal position of the laser beam from the target position, wherein the laser beam is irradiated on the surface of the workpiece through the lens and the protective glass that is disposed between the lens and the workpiece;

estimating a current spot diameter of the laser beam on the surface of the workpiece based on the current deviation amount and the relationship data; and correcting the current spot diameter by changing a relative position between the lens and the workpiece so that the focal position moves a total distance of a first distance and a second distance, wherein the first distance is a distance for moving the focal position so that the current deviation amount becomes zero, and wherein the second distance is a distance for moving the focal position from a position in which the current deviation amount is zero to a position in which the spot diameter on the surface becomes a target diameter.

8. The method according to claim 7, wherein the relationship data is stored in a memory as a table representing a slope of an approximate line indicating a relationship between the deviation amount and the spot diameter for each command value of a defocus amount.

9. The method according to claim 7, wherein the estimating the current spot diameter includes multiplying the current deviation amount by a slope of an approximate line read from the relationship data to obtain an increase amount of the spot diameter from the target diameter.

10. The method according to claim 7, wherein the processor is configured to move the focal position by the total distance of the first distance and the second distance in a single movement.

* * * * *